(12) United States Patent
Takeishi

(10) Patent No.: US 8,191,112 B2
(45) Date of Patent: May 29, 2012

(54) IMAGE FORMING APPARATUS, METHOD AND MEDIUM STORING PROGRAM

(75) Inventor: Hiroki Takeishi, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 436 days.

(21) Appl. No.: 12/501,896

(22) Filed: Jul. 13, 2009

(65) Prior Publication Data

US 2010/0017854 A1    Jan. 21, 2010

(30) Foreign Application Priority Data

Jul. 18, 2008   (JP) ................................ 2008-187910

(51) Int. Cl.
*H04L 29/06* (2006.01)
(52) U.S. Cl. ................................ 726/3; 726/2; 713/182
(58) Field of Classification Search ........................ 726/3
See application file for complete search history.

(56) References Cited

U.S. PATENT DOCUMENTS

| 2001/0053295 | A1* | 12/2001 | Kujirai et al. .................... | 399/79 |
| 2003/0123079 | A1* | 7/2003 | Yamaguchi et al. ......... | 358/1.15 |
| 2003/0172290 | A1* | 9/2003 | Newcombe et al. .......... | 713/200 |
| 2005/0246427 | A1* | 11/2005 | Ishii .............................. | 709/213 |

FOREIGN PATENT DOCUMENTS

JP   2000-357064   12/2000

OTHER PUBLICATIONS

"PDF Reference, Sixth Edition, Version 1.7", http://www.adobe.com/devnet/pdf/pdf_reference.html, Retrieved on Nov. 20, 2009.
"Postscript® Language Reference third edition", http://www.adobe.com/products/postscript/resources.html#white, Retrieved on Nov. 20, 2009.
"Uniform Resource Identifier (URI): Generic Syntax," Network Working Group RFC 3986, The Internet Society, 2005.

* cited by examiner

*Primary Examiner* — Edward Zee
*Assistant Examiner* — Yogesh Paliwal
(74) *Attorney, Agent, or Firm* — Fitzpatrick, Cella, Harper & Scinto

(57) ABSTRACT

The image forming apparatus acquires authentication information for authentication of document data and an authentication result. When the result indicates success, the document data is converted and is added with the specific information to specify the authentication apparatus and is stored. The image forming apparatus acquires the specific information from the converted data, transmits the specific information to a destination of the converted data, requests the destination to confirm establishment of a communication path from the destination to the authentication apparatus and transmits the converted data to the destination when receiving information representing establishment.

4 Claims, 16 Drawing Sheets

F I G. 13
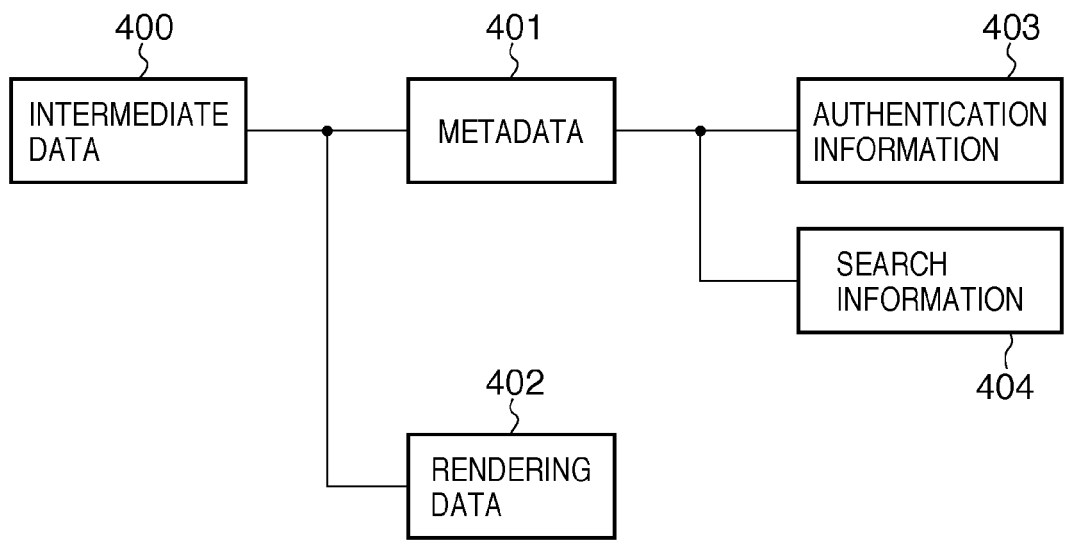
F I G. 14
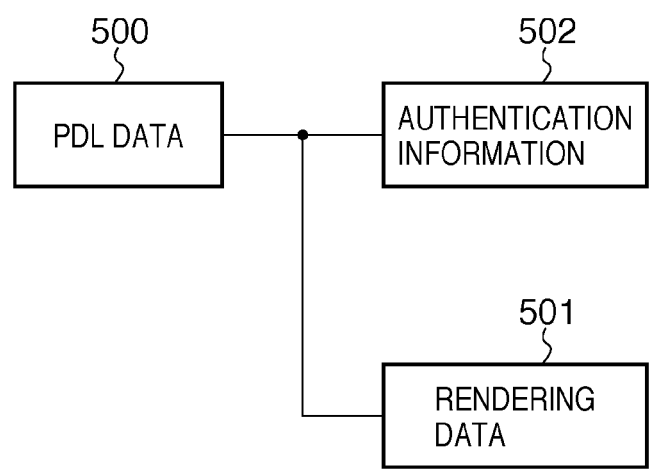

IMAGE FORMING APPARATUS, METHOD AND MEDIUM STORING PROGRAM

BACKGROUND OF THE INVENTION

1. Field of the Invention

The present invention relates to an image forming apparatus, method and a medium storing program, which convert and process document data.

2. Description of the Related Art

In recent years, image forming apparatuses such as an MFP and a printer keep growing more sophisticated. This provides a way for performing, via a network such as a LAN, PDL printing or transmission/reception of data containing images and texts stored in an image forming apparatus. It consequently becomes possible to exchange a document or an image represented by PDL data between image forming apparatuses by data transmission without any intervening PC or workstation.

FIG. 1 shows the configuration of a plurality of apparatuses connected to a network, including such an image forming apparatus. Personal computers (PCs) 101-0-0 and 101-0-1 can execute display, generation, editing, transfer, and print instruction of document data in accordance with user operations. An image forming apparatus 104-0 can digitize document data or visualize it on a paper medium, and also transmit/receive an image or document data via a network 102-0. These processes can be implemented based on instructions input from the information processing apparatuses 101-0-0 and 101-0-1 via the network 102-0 as well as in accordance with user operations on the image forming apparatus. That is, the image forming apparatus connected to the network such as a LAN can more easily execute more advanced processes.

Such a system capable of easily printing, copying, and transferring documents must have a way to define authority for these processes and place restrictions on various processes including printing, copy, and transfer for the sake of preventing information leakage and exercising strict internal control.

FIG. 2 is a view showing an example of a system arrangement for implementing restrictions on document processing. An authentication apparatus 107-0 is connected to the network 102-0, like the information processing apparatuses 101-0-0 and 101-0-1 and the image forming apparatus 104-0. The authentication apparatus 107-0 can respond to an authentication process request from the information processing apparatuses 101-0-0 and 101-0-1 and the image forming apparatus 104-0 via the LAN.

An arrangement and process sequence for implementing PDL data printing via an authentication process will be described below.

FIG. 3 is a block diagram showing the arrangement of the authentication apparatus 107-0 and the image forming apparatus 104-0 connected via the network 102-0. The image forming apparatus 104-0 includes a network IF 10401. The network IF 10401 implements communication with the network 102-0. A user system 10402 controls the network IF 10401, an IO controller 10403, a UI controller 10406, an engine controller 10408, a PDL interpreter 10410, and a RIP 10409. This arrangement implements, for example, visualization on a medium represented by paper. The IO controller 10403 can control an HDD 10404 and store information represented by PDL data. The UI controller 10406 controls a UI panel 10405 to receive an instruction or information associated with authentication from the user and transmit it to the user system 10402. The UI controller 10406 can also control the UI panel 10405 to display and present, to the user, information such as progress of a print process or an error. The engine controller 10408 controls a printer engine 10407 to form a visible image on a visible medium represented by paper.

FIG. 4 is a flowchart illustrating the procedure of an authentication process. In step S1001, the PDL interpreter 10410 receives a process start instruction for target PDL data from the user system 10402. In step S1002, the PDL interpreter 10410 checks, based on the instruction from the user system 10402, whether the target PDL data needs authentication. Whether the PDL data requires authentication can be determined based on a flag in it.

Upon determining in step S1002 that authentication is necessary, the PDL interpreter 10410 reads user authentication information in step S1003. The user authentication information is obtained based on user input from the UI panel 10405 controlled by the UI controller 10406. This information includes, for example, an ID and password. In step S1004, the PDL interpreter 10410 requests the authentication apparatus 107-0 to execute an authentication process based on the information represented by an ID and password. The authentication process request is implemented by transmitting, to the authentication apparatus 107-0 via the network 102-0, data transmitted/received by the network IF 10401 controlled by the user system 10402.

The authentication apparatus 107-0 receives the authentication process request and determines, based on the information represented by an ID and password, whether the target PDL data can undergo a process. This process corresponds to a print process if the image forming apparatus is going to form a visible image. Processes for which the authentication apparatus 107-0 can perform authentication determination include display, editing, and transfer in addition to the print process. In correspondence with one or more IDs, the authentication apparatus 107-0 holds information representing whether the above-described processes are possible. In step s1005, the PDL interpreter 10410 executes an interpretation process of a target PDL.

FIG. 5 is a view showing the relationship between PDL data and information used for authentication determination. As shown in FIG. 5, PDL data 20001 held in the image forming apparatus is associated with an authentication information DB 20002 provided in the authentication apparatus 107-0. The authentication information DB 20002 has an authentication information table 20003 associated with each PDL data 20001. The authentication information table shows pieces of authority information the users associated with the IDs have for the respective processes. Communicating with the authentication apparatus 107-0 to refer to the authority information enables to derive, for each PDL data, which user is allowed to perform which process.

Besides this technique, Japanese Patent Laid-Open No. 2000-357064 describes a technique of managing information of operations permitted for each user, and giving authority to permit or prohibit an operation to be performed by each user on a device based on the management information. A URI to be described later is described in Uniform Resource Identifiers, RFC3986. PDL data is described in "PDF Reference, Sixth Edition, version 1.7", available at the URL www.adobe.com/devnet/pdf/pdf_reference.html or "Postscript® Language Reference third edition", available at the URL www.adobe.com/products/postscript/resources.html#white.

Document data such as PDL data can impose restrictions on processes such as distribution and printing. However, this restriction function depends on the structure of PDL data. Once PDL data is converted into intermediate data or the like, the processes cannot be restricted any more. Hence, when exchanging intermediate data between image forming apparatuses, no restrictions can be placed on the above-described processes, and the security level decreases.

SUMMARY OF THE INVENTION

The present invention provides an image forming apparatus capable of maintaining security level when exchanging intermediate data between image forming apparatuses.

The present invention in its first aspect provides an image forming apparatus which is connected to an authentication apparatus via a network, converts document data that requires authentication by the authentication apparatus, and executes a process using converted data, comprising:

an authentication information acquisition unit configured to acquire authentication information to be used for authentication of the document data;

an authentication result acquisition unit configured to transmit the authentication information to the authentication apparatus to request authentication and acquire an authentication result;

a conversion unit configured to convert the document data into the converted data when the authentication result of the document data acquired by the authentication result acquisition unit indicates success of authentication;

an adding unit configured to add specific information to specify the authentication apparatus to the converted data converted by the conversion unit; and a storage unit configured to store the converted data to which the conversion unit has added the specific information.

The present invention in its second aspect provides an image forming method executed by an image forming apparatus which is connected to an authentication apparatus via a network, converts document data that requires authentication by the authentication apparatus, and executes a process using converted data, comprising the steps of:

acquiring authentication information to be used for authentication of the document data;

transmitting the authentication information to the authentication apparatus to request authentication and acquiring an authentication result;

converting the document data into the converted data when the authentication result of the document data acquired in the step of acquiring the authentication result indicates success of authentication;

adding specific information to specify the authentication apparatus to the converted data converted in the converting step; and storing the converted data to which the specific information has been added in the adding step.

The present invention in its third aspect provides a computer-readable medium storing an image forming program which is connected to an authentication apparatus via a network, converts document data that requires authentication by the authentication apparatus, and executes a process using converted data, the program causing a computer to function to:

acquire authentication information to be used for authentication of the document data;

transmit the authentication information to the authentication apparatus to request authentication and acquire an authentication result;

convert the document data into the converted data when the acquired authentication result of the document data indicates success of authentication;

add specific information to specify the authentication apparatus to the converted data; and store the converted data to which the specific information has been added.

According to the present invention, it is possible to maintain security level when exchanging intermediate data between image forming apparatuses.

Further features of the present invention will become apparent from the following description of exemplary embodiments with reference to the attached drawings.

BRIEF DESCRIPTION OF THE DRAWINGS

FIG. 13 is a view showing the structure of intermediate data according to the first embodiment;

FIG. 14 is a view showing the structure of PDL data according to the first embodiment;

DESCRIPTION OF THE EMBODIMENTS

Figure 1:
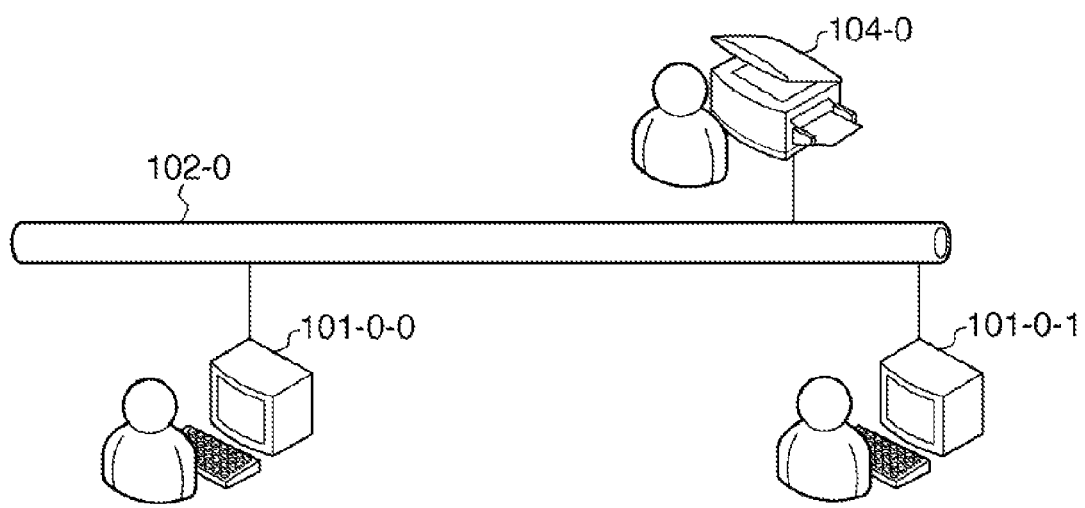
FIG. 1 is a view showing the configuration of a plurality of apparatuses connected to one network.

The best mode for carrying out the present invention will now be described in detail with reference to the accompanying drawings. The same reference numerals denote the same constituent elements, and a description thereof will be omitted.

<First Embodiment>

Figure 6:
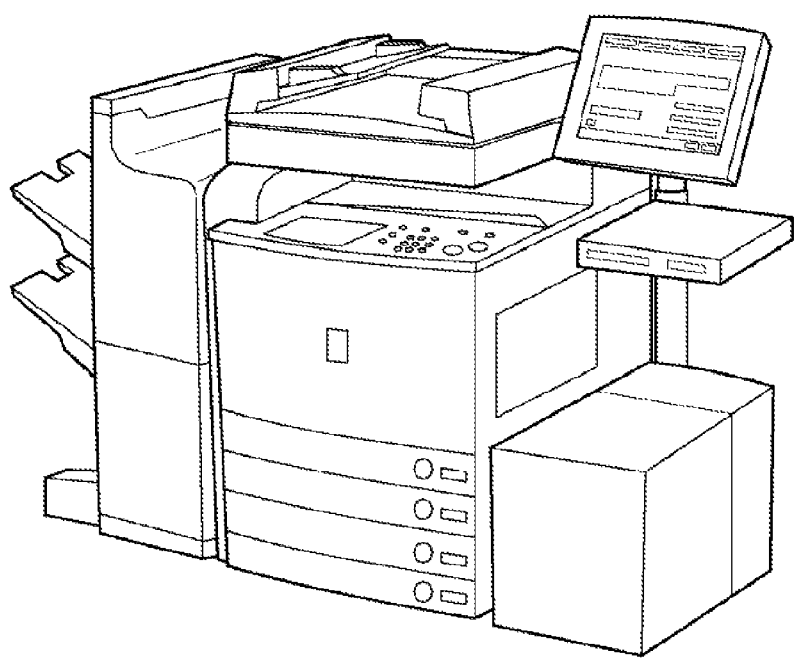
FIG. 6 is a perspective view showing the outer appearance of an image forming apparatus.
Figure 7:
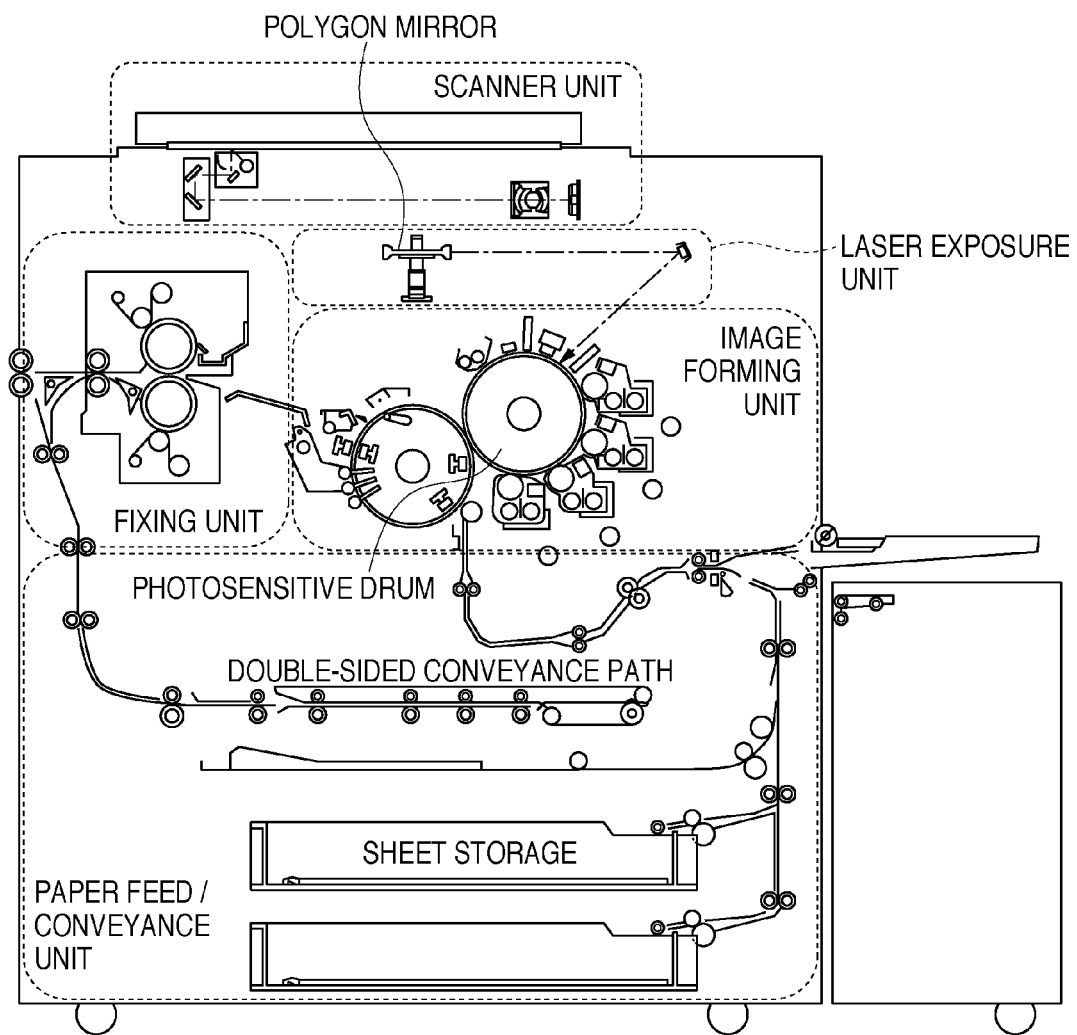
FIG. 7 is a sectional view showing the general arrangement of the image forming apparatus.

In this embodiment, an image forming apparatus having an outer appearance shown in FIG. 6 and an arrangement shown in FIG. 7 is used. The image forming apparatus may be an apparatus called a multi function peripheral which includes, for example, an image reading apparatus, facsimile apparatus, network IF (interface), and image processing apparatus. Alternatively, various kinds of image forming apparatuses such as a copying machine, facsimile apparatus, and printing press having another arrangement may be used in this embodiment.

[Explanation of Image Forming Apparatus according to Embodiment]

Figure 8:
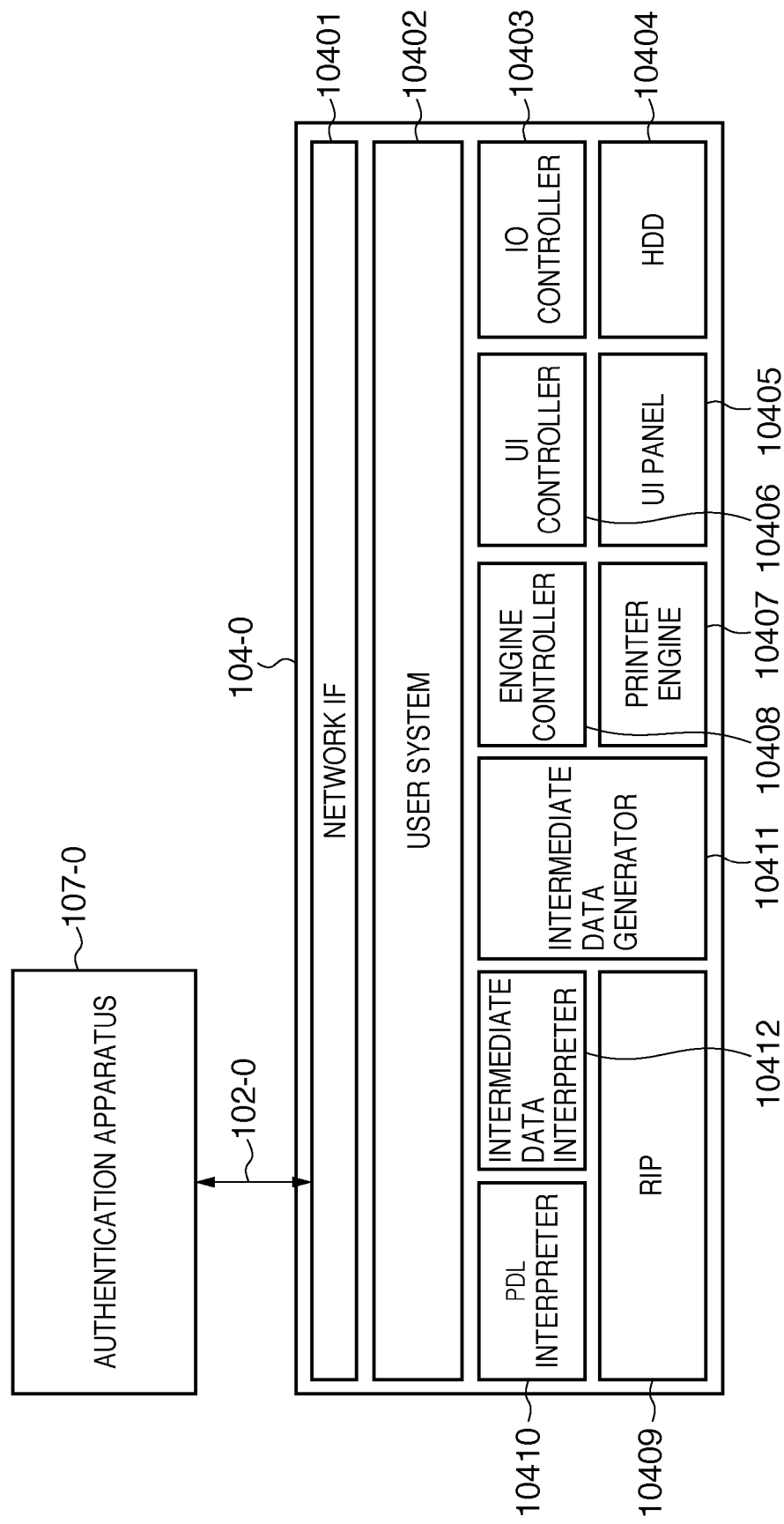
FIG. 8 is a block diagram showing the arrangement of an image forming apparatus according to the first embodiment of the present invention.

FIG. 8 is a block diagram showing the arrangement of an image forming apparatus 104-0 according to this embodiment, which is connected to an authentication apparatus 107-0 via a network 102-0. The image forming apparatus 104-0 includes a network IF 10401. The network IF 10401 implements communication via the network 102-0. The communication via the network 102-0 enables the image forming apparatus 104-0 to obtain PDL data or converted data generated by converting the PDL data. Note that the converted data is also called intermediate data in this embodiment. In this embodiment, PDL data will be described as an example of document data. However, any data other than PDL data is also usable if it has a document structure and can add a security policy to authenticate processes for each user.

A user system 10402 controls the network IF 10401 and an IO controller 10403, UI controller 10406, engine controller 10408, PDL interpreter 10410, and RIP 10409 to be described later. This implements visualization on a medium represented by paper.

The IO controller 10403 can control an HDD 10404 and store information represented by PDL data or intermediate data to be described later. The UI controller 10406 controls a UI panel 10405 to receive an instruction or information associated with authentication from the user and transmit it to the user system 10402. The UI controller 10406 can also control the UI panel 10405 to display and present, to the user, information such as progress of a print process or an error.

An intermediate data generator 10411 can convert PDL data into intermediate data to be described later. An intermediate data interpreter 10412 interprets intermediate data to be described later and notifies the RIP of the interpretation result.

[Explanation of PDL Data according to Embodiment]

PDL data according to the embodiment will be described next. FIG. 14 shows the structure of PDL data according to the embodiment. As shown in FIG. 14, PDL data 500 includes rendering data 501 and authentication information 502. The rendering data can hold at least one of text information, image information, and graphic information. Image data is raster graphic data which expresses an image by having color information in a discrete space. Graphic data is vector graphic data which expresses an image by having information representing point coordinates and color information to fill a space.

The image forming apparatus 104-0 receives the PDL data 500 from another apparatus via the network IF 10401. The user system 10402 sends the received PDL data 500 to the IO controller 10403. The IO controller 10403 controls the HDD 10404 to store the PDL data 500 obtained by the user system 10402.

The PDL data 500 thus stored in the image forming apparatus 104-0 is analyzed by the PDL interpreter 10410 in accordance with an instruction from the user system 10402. The analysis result is transmitted to the RIP 10409. Based on the analysis result from the PDL interpreter 10410, the RIP 10409 rasterizes the rendering data 501 in the PDL data 500, thereby obtaining a bitmap image. The user system 10402 sends the bitmap image to the engine controller 10408. The engine controller 10408 controls a printer engine 10407 to form a visible image on a visible medium represented by paper using the received bitmap image.

Figure 4:
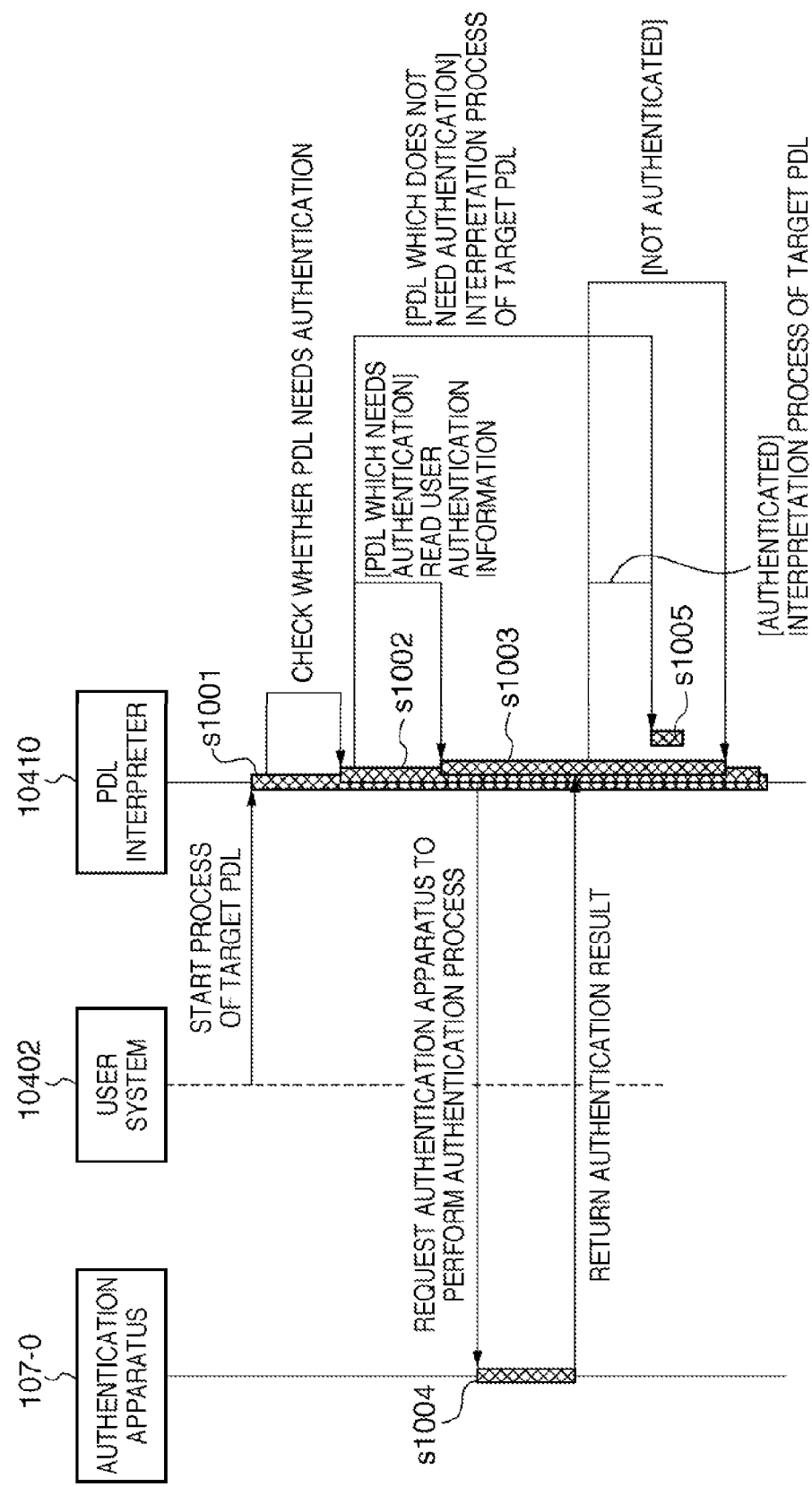
FIG. 4 is a flowchart illustrating the procedure of an authentication process.
Figure 5:
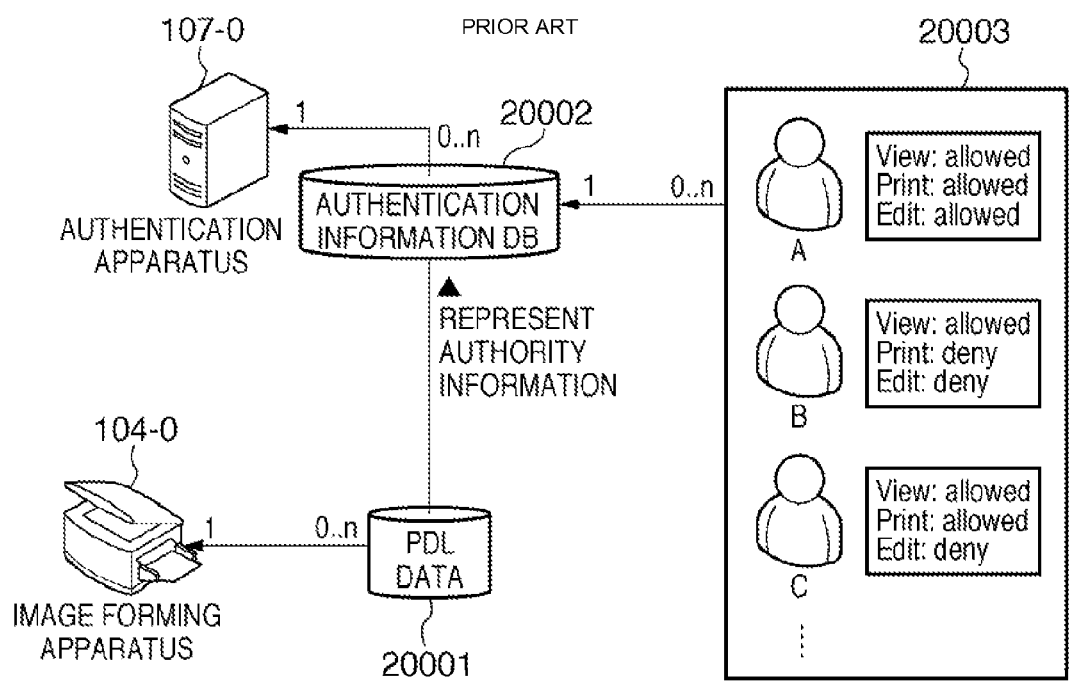
FIG. 5 is a view showing the relationship between PDL data and information used for authentication determination.

The authentication information 502 shown in FIG. 14 is used for an authentication process that is necessary for executing a process such as printing or transfer of the target PDL data 500. The authentication information represents, for example, the communication method to be used for the authentication apparatus and types of processes that require authentication. Authentication is the process described with reference to FIG. 4.

[Explanation of Conversion Process to Intermediate Data according to Embodiment]

Intermediate data 400 convertible from the PDL data 500 will be described next. FIG. 13 shows the structure of intermediate data according to the embodiment. As shown in FIG. 13, the intermediate data 400 includes metadata 401 and rendering data 402. The rendering data 402 holds at least one of text information, image information, and graphic information, as in the PDL data 500. Image data is raster graphic data which expresses an image by having color information in a discrete space. Graphic data is vector graphic data which expresses an image by having information representing point coordinates and color information to fill a space. The metadata 401 includes authentication information 403 to be described later and search information 404 to search for the contents of the rendering data 402.

The intermediate data 400 is generated by the following process using the intermediate data generator 10411. The image forming apparatus 104-0 receives the PDL data 500 from another apparatus via the network IF 10401. The user system 10402 sends the received PDL data 500 to the IO controller 10403. The IO controller 10403 controls the HDD 10404 to store the PDL data 500 obtained by the user system 10402.

The PDL data 500 thus stored in the image forming apparatus 104-0 is analyzed by the PDL interpreter 10410 in accordance with an instruction from the user system 10402. The analysis result is transmitted to the intermediate data generator 10411. At this time, the PDL interpreter 10410 reads the authentication information 502 from the PDL data, and after the authentication process, transmits the analysis result to the intermediate data generator 10411, as will be described later. Based on the analysis result from the PDL interpreter 10410, the intermediate data generator 10411 converts the PDL data 500 into the intermediate data 400. The generated intermediate data 400 is transmitted to the IO controller 10403 via the user system 10402. The IO controller 10403 controls the HDD 10404 to store the received intermediate data 400. The thus generated intermediate data 400 can be printed, displayed, transferred, or edited.

The print process of the intermediate data 400 will be described next. As described above, the intermediate data 400 converted from the PDL data 500 is stored in the HDD 10404. The stored intermediate data 400 is read from the HDD 10404 via the IO controller 10403 in accordance with an instruction from the user system 10402.

The readout intermediate data 400 is transmitted to the intermediate data interpreter 10412 via the user system 10402. The intermediate data interpreter 10412 interprets the received intermediate data 400 and transmits the analysis result to the RIP 10409 under the control of the user system 10402. Based on the analysis result from the intermediate data interpreter 10412, the RIP 10409 rasterizes the rendering data 501 in the PDL data 500, thereby obtaining a bitmap image. The user system 10402 sends the bitmap image to the engine controller 10408. The engine controller 10408 controls the printer engine 10407 to form a visible image on a visible medium represented by paper using the received bitmap image.

[Authentication Process and Conversion Process to Intermediate Data]

Figure 10:
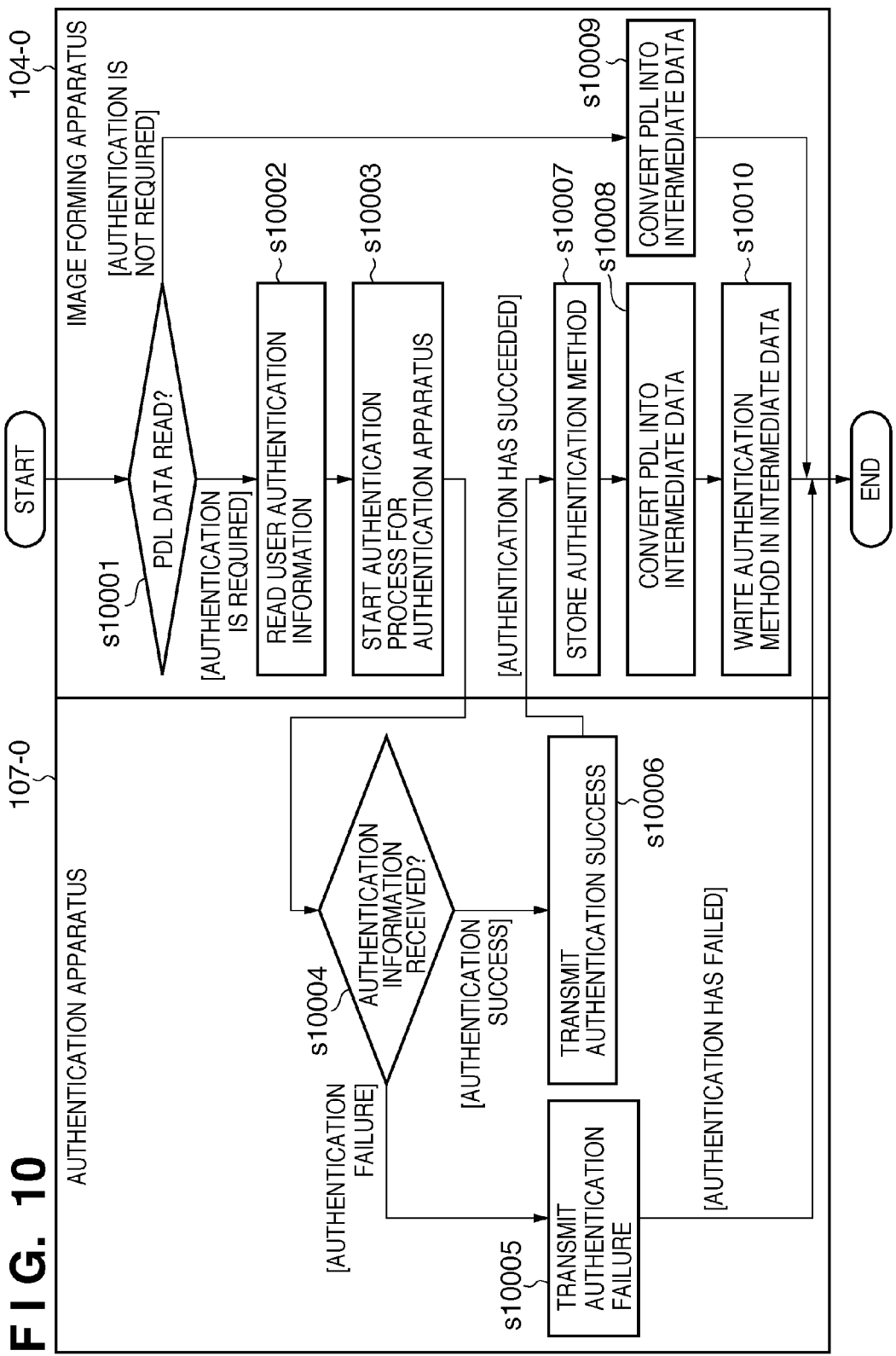
FIG. 10 is a flowchart illustrating the procedure of a process of converting PDL data into intermediate data according to the first embodiment.

In the process of converting the PDL data 500 into the intermediate data 400, it is necessary to first perform the authentication process and then transmit the analysis result to the intermediate data generator 10411. This process will be described with reference to FIGS. 2, 8, and 10.

In step S10001, the PDL interpreter 10410 reads out the PDL data 500. The PDL interpreter 10410 determines, based on the authentication information 502, whether the target PDL data 500 needs authentication. If it is determined that authentication is necessary, the process advances to step S10002. If it is determined that authentication is unnecessary, the process advances to step S10009.

In step S10002, the PDL interpreter 10410 requests user authentication information necessary for authentication of the user system 10402. The user authentication information indicates an ID and password required for the authentication process. The user system 10402 obtains the user authentication information by the following process.

As described above, the image forming apparatus 104-0 includes the UI controller 10406 and the UI panel 10405. The UI controller 10406 controls the UI panel 10405 to receive an instruction or information associated with authentication from the user and transmit it to the user system 10402. The UI controller 10406 can also control the UI panel 10405 to display and present, to the user, information such as progress of a print process or an error. That is, the user system 10402 obtains authentication information including an ID and password by a user input to the UI panel 10405 and transmits the information to the PDL interpreter 10410.

In step S10003, the PDL interpreter 10410 analyzes the authentication information 502 in the PDL data 500 and starts communicating with the authentication apparatus 107-0 to request the authentication process. In this process, the PDL interpreter 10410 obtains, for example, information to be used for communication with the authentication apparatus 107-0, which is included in the authentication information 502.

Figure 2:
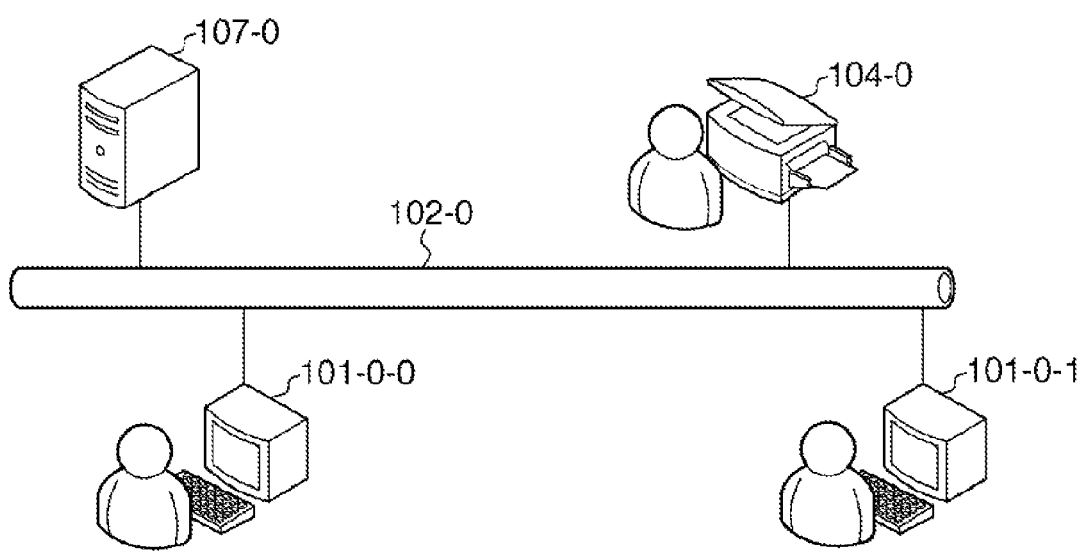
FIG. 2 is a view showing an example of a system arrangement for implementing restrictions on document processing.
Figure 3:
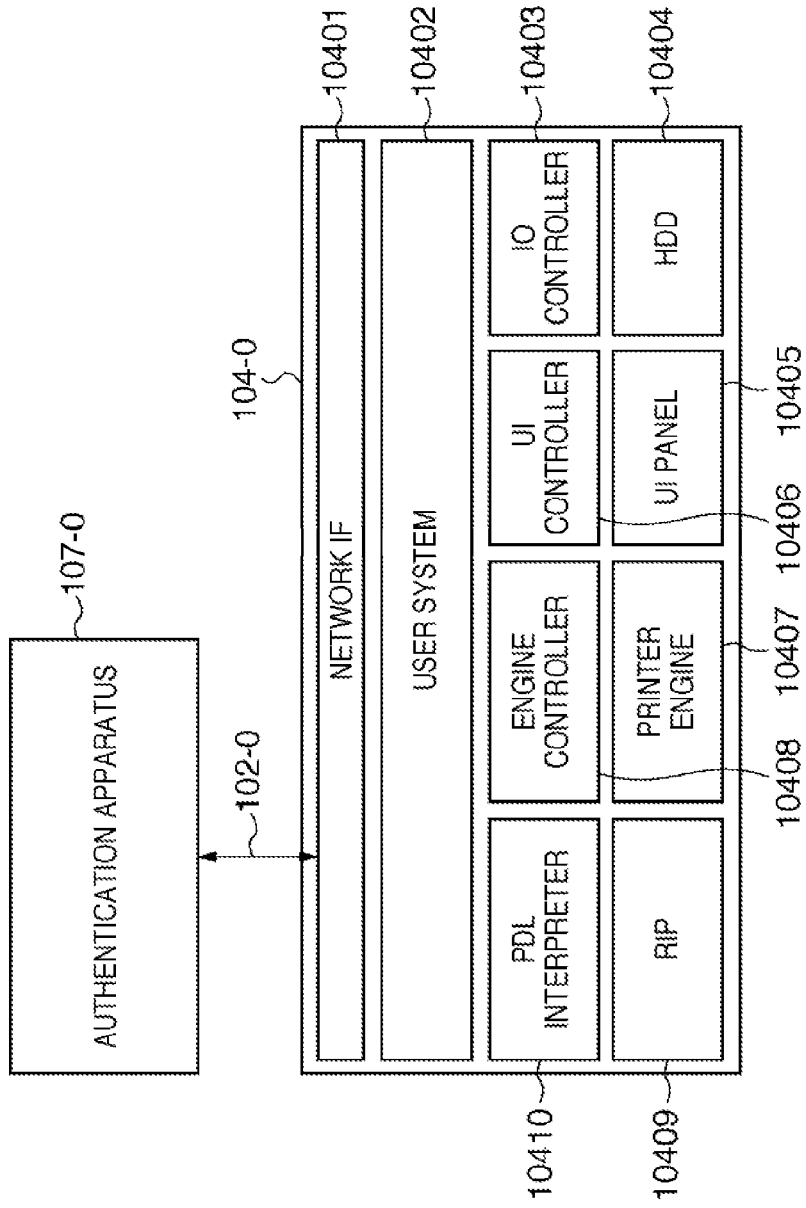
FIG. 3 is a block diagram showing the arrangement of an image forming apparatus.

The process in step S10003 is necessary for establishing communication with the authentication apparatus 107-0 when the image forming apparatus 104-0 and the authentication apparatus 107-0 are connected via the network 102-0 as shown in FIG. 2. More specifically, the PDL interpreter 10410 acquires the IP address of the authentication apparatus 107-0 in this process. Not the IP address but any other information may be obtained if it is specific information to specify the apparatus.

The process in steps S10002 and S10003 is an example of authentication information acquisition according to the embodiment.

After the communication with the authentication apparatus 107-0 has been established by the above-described process, the PDL interpreter 10410 requests the user system 10402 to perform communication via the network IF 10401. In response to the request, the user system 10402 controls the network IF 10401 to establish communication for the authentication process required by the PDL interpreter 10410.

After the establishment of communication, the PDL interpreter 10410 requests the authentication apparatus 107-0 to perform an authentication process based on the authentication information 502. Upon receiving the authentication process request in step S10004, the authentication apparatus 107-0 executes the authentication process and determines whether the authentication has succeeded.

Upon determining that the authentication has succeeded, the authentication apparatus 107-0 advances to step S10006 to notify the image forming apparatus 104-0 of the success of authentication. On the other hand, if the authentication has failed, the authentication apparatus 107-0 advances to step S10005 to notify the image forming apparatus 104-0 of the failure of authentication. The process of causing the image forming apparatus to receive the notification from the authentication apparatus in step S10005 or S10006 is an example of authentication result acquisition according to the embodiment.

Upon receiving the notification from the authentication apparatus, the PDL interpreter 10410 of the image forming apparatus 104-0 can recognize the success or failure of authentication based on the communication. Upon recognizing the success, the process advances to step S10007. Upon recognizing the failure, the process ends without converting the PDL data 500 into the intermediate data 400.

In step S10007, the authentication method information is stored. More specifically, the information required for the authentication process is stored, including the IP address of the authentication apparatus 107-0. After the storage process, the PDL interpreter 10410 interprets the PDL data and notifies the intermediate data generator 10411 of the result, thereby generating the intermediate data 400 in step S10008.

In step S10010, the PDL interpreter 10410 refers to the information required for the authentication process and stored in step S10007, adds the information to the intermediate data, and stores the intermediate data added with the information. In this embodiment, the information required for the authentication process is stored in the authentication information 403 that is part of the metadata 401 in FIG. 13. The process of converting the PDL data 500 into the intermediate data 400 thus finishes.

[Explanation of Intermediate Data Distribution Process]

Figure 9:
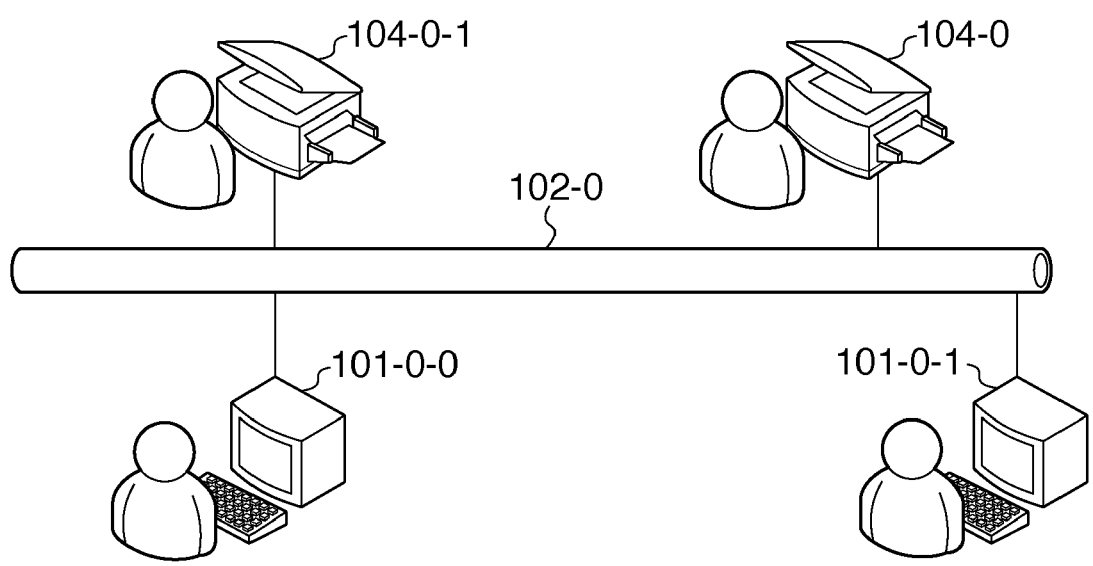
FIG. 9 is a view showing an example of an arrangement in which a plurality of image forming apparatuses and information processing apparatuses are connected.

As described above, the intermediate data 400 is obtained by converting the PDL data 500. However, the conversion need not always be performed in the image forming apparatus 104-0. In the arrangement shown in FIG. 9, a plurality of image forming apparatuses and a plurality of information processing apparatuses such as PCs and workstations are connected via the network 102-0 represented by a LAN. An image forming apparatus 104-0-1 and information processing apparatuses 101-0-0 and 101-0-1 shown in FIG. 9 can convert the PDL data 500 into the intermediate data 400, like the image forming apparatus 104-0. In this environment, for example, the image forming apparatus 104-0-1 may convert the PDL data 500 into the intermediate data 400 and transmit it to the image forming apparatus 104-0 via the network 102-0 so that the image forming apparatus 104-0 acquires the intermediate data 400. Alternatively, the information processing apparatus 101-0-0 or 101-0-1 may convert the PDL data 500 into the intermediate data 400 and transmit it to the image forming apparatus 104-0 via the network 102-0 so that the image forming apparatus 104-0 acquires the intermediate data 400.

Figure 11:
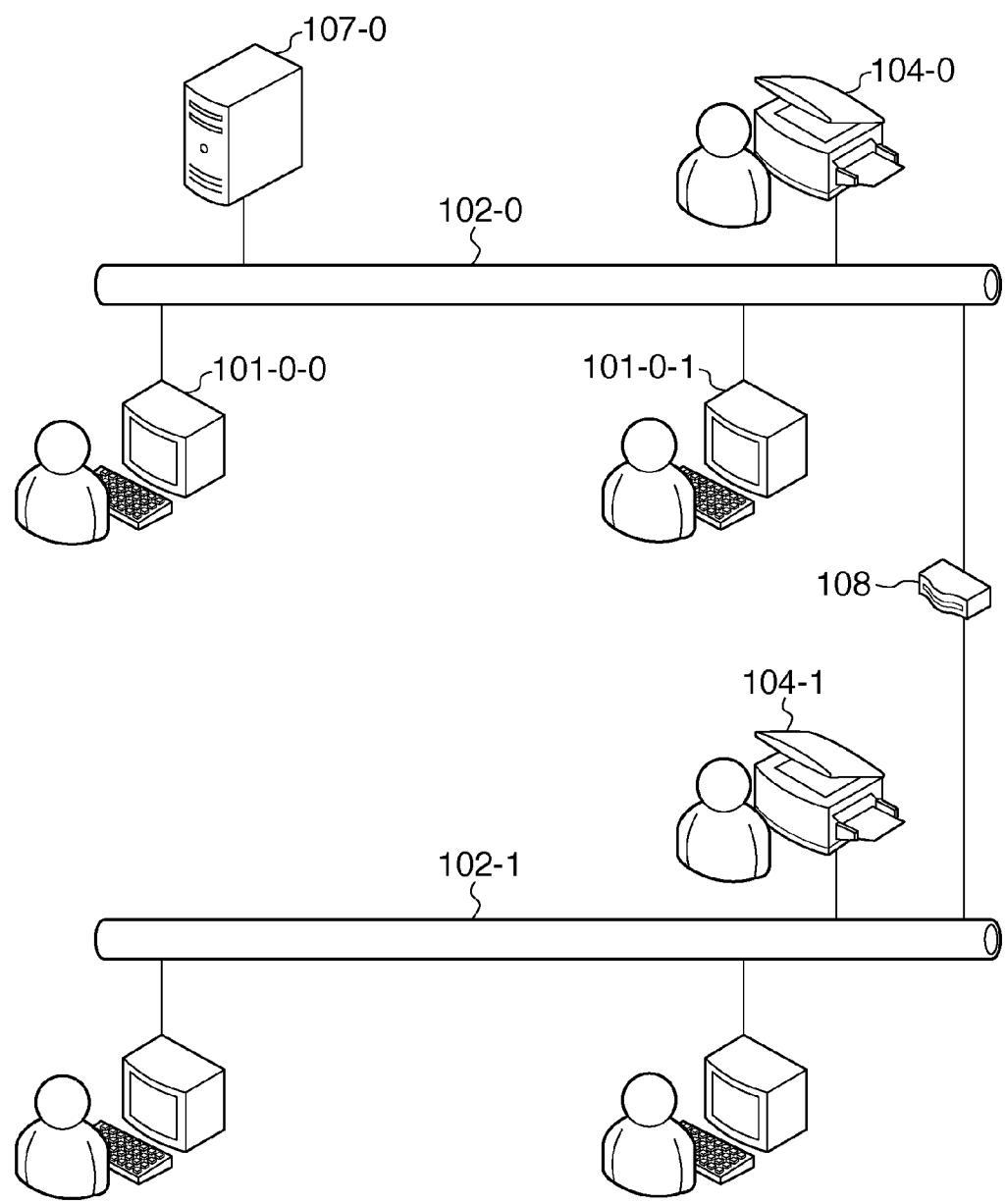
FIG. 11 is a view showing an example of an arrangement in which a plurality of networks are connected.

As described above, when the plurality of information processing apparatuses or image forming apparatuses are connected to the network represented by a LAN, the apparatuses can exchange intermediate data with each other. This process allows distributing intermediate data generated in a given apparatus to another apparatus. The process of distributing the intermediate data 400 according to the embodiment will be described below with reference to FIGS. 11 and 12.

A router 108 can connect a plurality of networks. A network 102-1 is represented by a LAN and connected to the network 102-0 via the router 108 so that the networks can communicate with each other. An image forming apparatus 104-1 can process the intermediate data 400, like the image forming apparatus 104-0.

Figure 12:
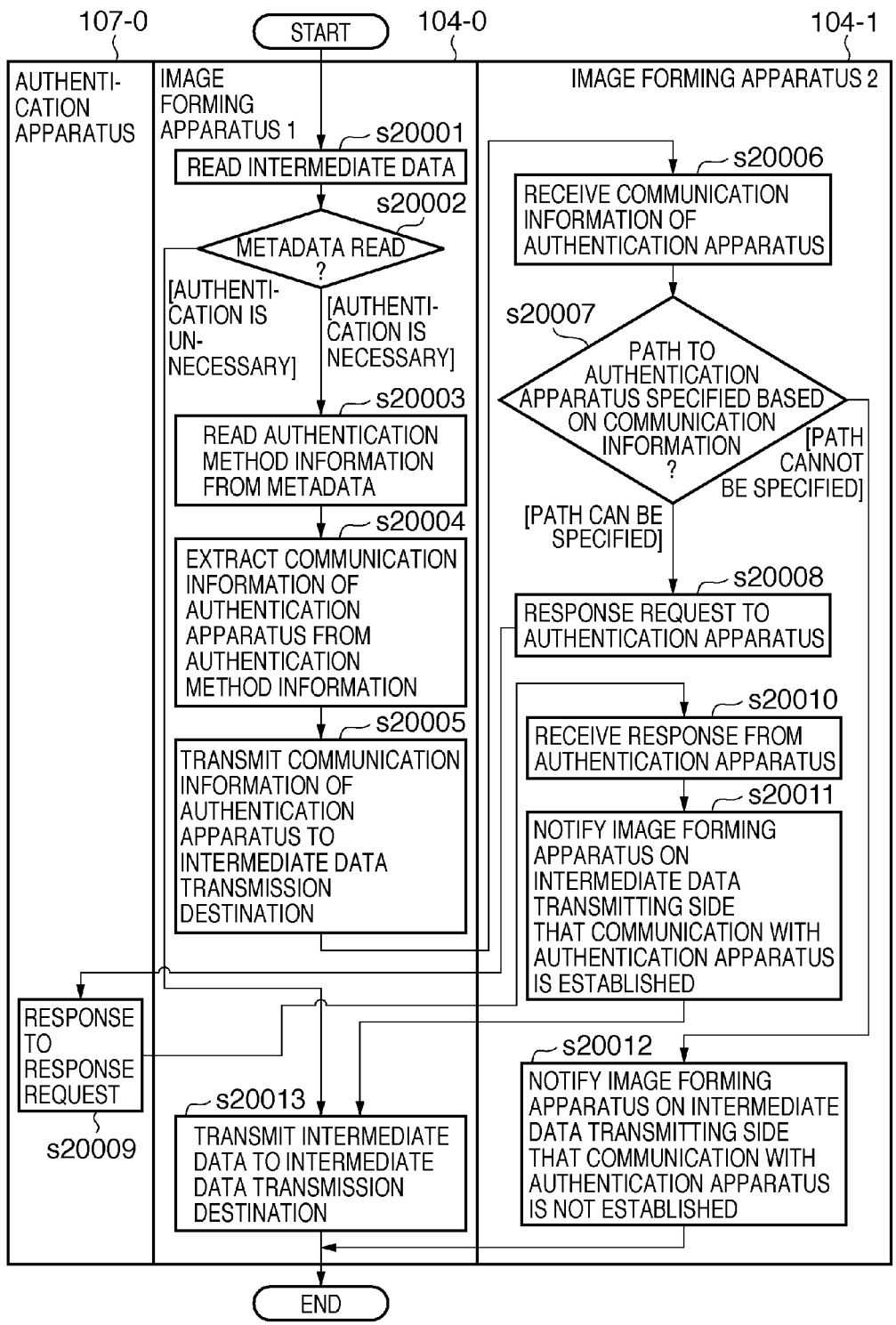
FIG. 12 is a flowchart illustrating the procedure of an intermediate data transmission process according to the first embodiment.

To explain the process of the embodiment, the procedure of an intermediate data distribution process of transmitting intermediate data from the image forming apparatus 104-0 to the image forming apparatus 104-1 in the above arrangement will be described next with reference to FIG. 12.

In step S20001, the intermediate data interpreter 10412 reads out the intermediate data 400 via the user system 10402. In step S20002, the intermediate data interpreter 10412 reads the metadata from the intermediate data 400. With this process, the intermediate data interpreter 10412 can read the authentication information 403 from the metadata 401. The intermediate data interpreter 10412 determines, based on the read authentication information 403, whether the target intermediate data 400 needs authentication. The determination may be done by referring to, for example, a flag in the authentication information.

If it is determined that the target intermediate data 400 needs authentication, the process advances to step S20003. If it is determined that the target intermediate data 400 does not need authentication, the process advances to step S20013 to transmit the intermediate data to the transmission destination.

In step S20003, the intermediate data interpreter 10412 reads the authentication information 403 from the metadata 401. In step S20004, the intermediate data interpreter 10412 obtains communication information of the authentication apparatus. For example, information including the IP address of the authentication apparatus 107-0 is obtained, as described above. In step S20005, the intermediate data interpreter 10412 requests the user system 10402 to transmit the communication information (e.g., IP address) of the authentication apparatus to the intermediate data transmission destination. In response to the request from the intermediate data interpreter 10412, the user system 10402 controls the network IF 10401 to transmit the communication information of the authentication apparatus to the image forming apparatus 104-1 of the transmission destination via the network 102-0. The transmitted communication information of the authentication apparatus is transferred to the network 102-1 via the router 108 and arrives at the image forming apparatus 104-1 connected to the network 102-1.

In step S20006, the image forming apparatus 104-1 receives the communication information of the authentication apparatus. In step S20007, the image forming apparatus 104-1 determines based on this information whether it is possible to specify the communication path to the authentication apparatus. Upon determining that the path can be specified, the image forming apparatus 104-1 executes the process in step S20008. Upon determining that the path cannot be specified, the process advances to step S20012. In step S20012, the image forming apparatus 104-1 notifies the image forming apparatus 104-0, that is, the image forming apparatus on the intermediate data transmitting side that the communication with the authentication apparatus 107-0 cannot be established. Upon receiving the data representing that the communication with the authentication apparatus 107-0 cannot be established, the image forming apparatus 104-0 ends the process without transmitting the intermediate data.

In step S20008, the image forming apparatus 104-1 communicates with the authentication apparatus 107-0 based on the specified communication path and requests a response. This response request is, for example, a response request by a "ping" command. The "ping" command is a communication command to communicate with the IP address of an apparatus that is supposed to be connected via the network and confirm whether the data of the communication has arrived at the desired apparatus, and a response from the apparatus has arrived at the transmission source. In step S20009, the authentication apparatus 107-0 returns a response based on the communication of the response request.

In step S20010, the image forming apparatus 104-1 receives the response from the authentication apparatus 107-0. Based on this reception, the image forming apparatus 104-1 notifies, in step S20011, the image forming apparatus 104-0 on the transmitting side of the intermediate data 400 that the communication with the authentication apparatus 107-0 has been established.

Upon receiving the data representing that the communication with the authentication apparatus 107-0 has been established, the image forming apparatus 104-0 transmits the intermediate data to the apparatus of the intermediate data transmission destination, that is, the image forming apparatus 104-1 in step S20013.

According to the above-described embodiment, it is possible to reduce the risk of leaking intermediate data obtained by converting PDL data outside the network. Assume an environment shown in FIG. 16. In this environment, the networks 102-0 and 102-1 are connected via the router 108. These networks are further connected to another network 102-2 via a network 102-3 such as the Internet. In such an environment, the networks 102-0 and 102-1 are assumed to be LANs in a given organization, and the network 102-2 is assumed to be a LAN in another organization. These networks are assumed to be connected to the Internet. Under these circumstances, it is not preferable that the contents of PDL data that is generated in the former organization and requires authentication are transmitted to the network 102-2 of the latter outsider organization and browsed or printed.

In this embodiment, before converting PDL data into intermediate data, the image forming apparatus temporarily requests the authentication apparatus to authenticate a process such as transfer. When authentication has succeeded, information (e.g., the IP address of the authentication apparatus) necessary for the authentication process is added to the intermediate data so that the intermediate data inherits the information necessary for authentication of the original PDL data.

Additionally, before transferring the intermediate data, the image forming apparatus transmits information necessary for the authentication process to the transfer destination, and confirms establishment of a path from the transfer destination to the authentication apparatus. After the confirmation, the image forming apparatus transmits the intermediate data. This arrangement prevents transfer to an apparatus incapable of authenticating the intermediate data (incapable of establishing the path to the authentication apparatus). It is therefore possible to implement, even for the intermediate data, process restrictions by authentication for the PDL data.

Figure 16:
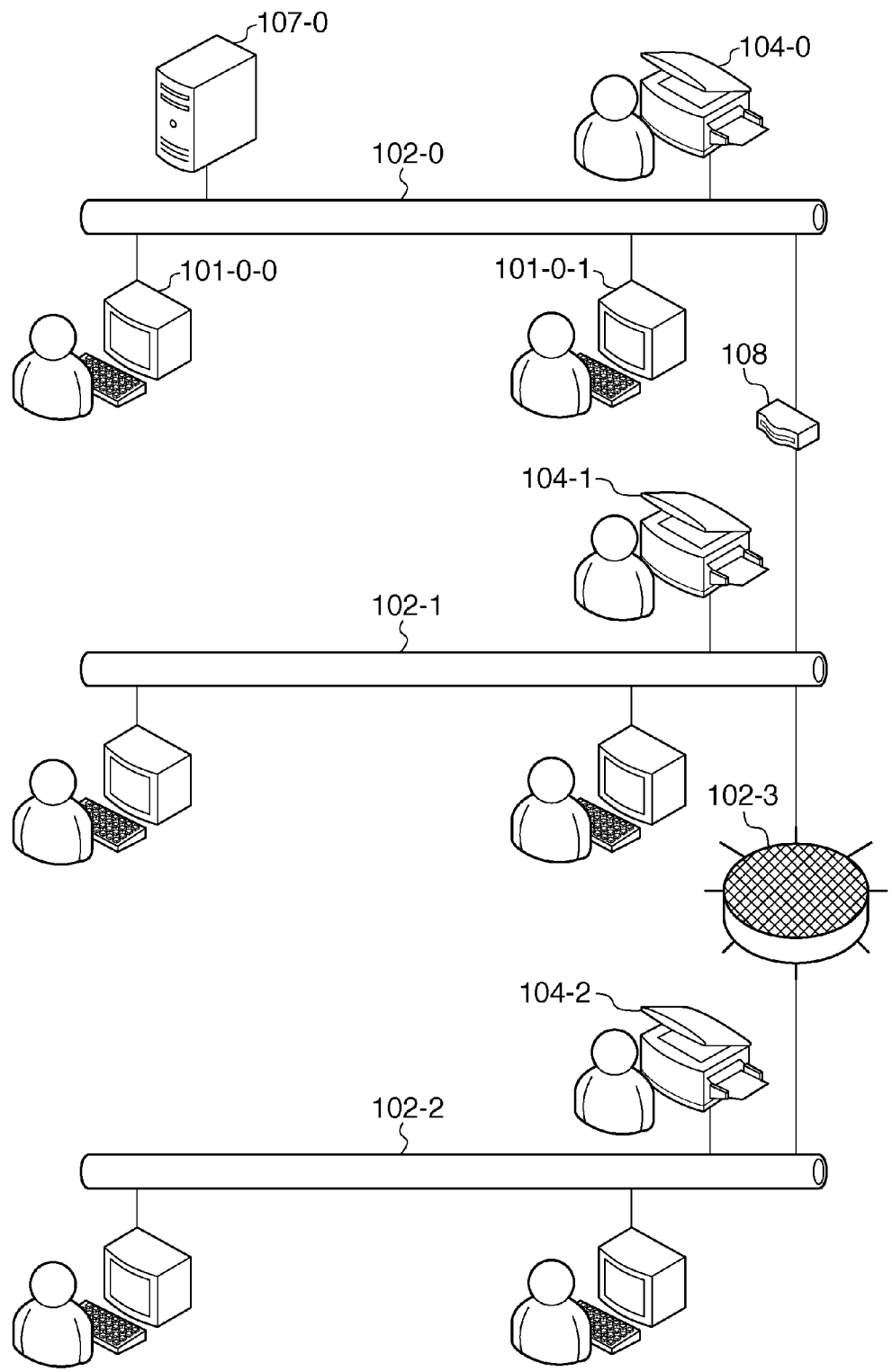
FIG. 16 is a view showing another example of the arrangement in which a plurality of networks are connected.
Figure 17:
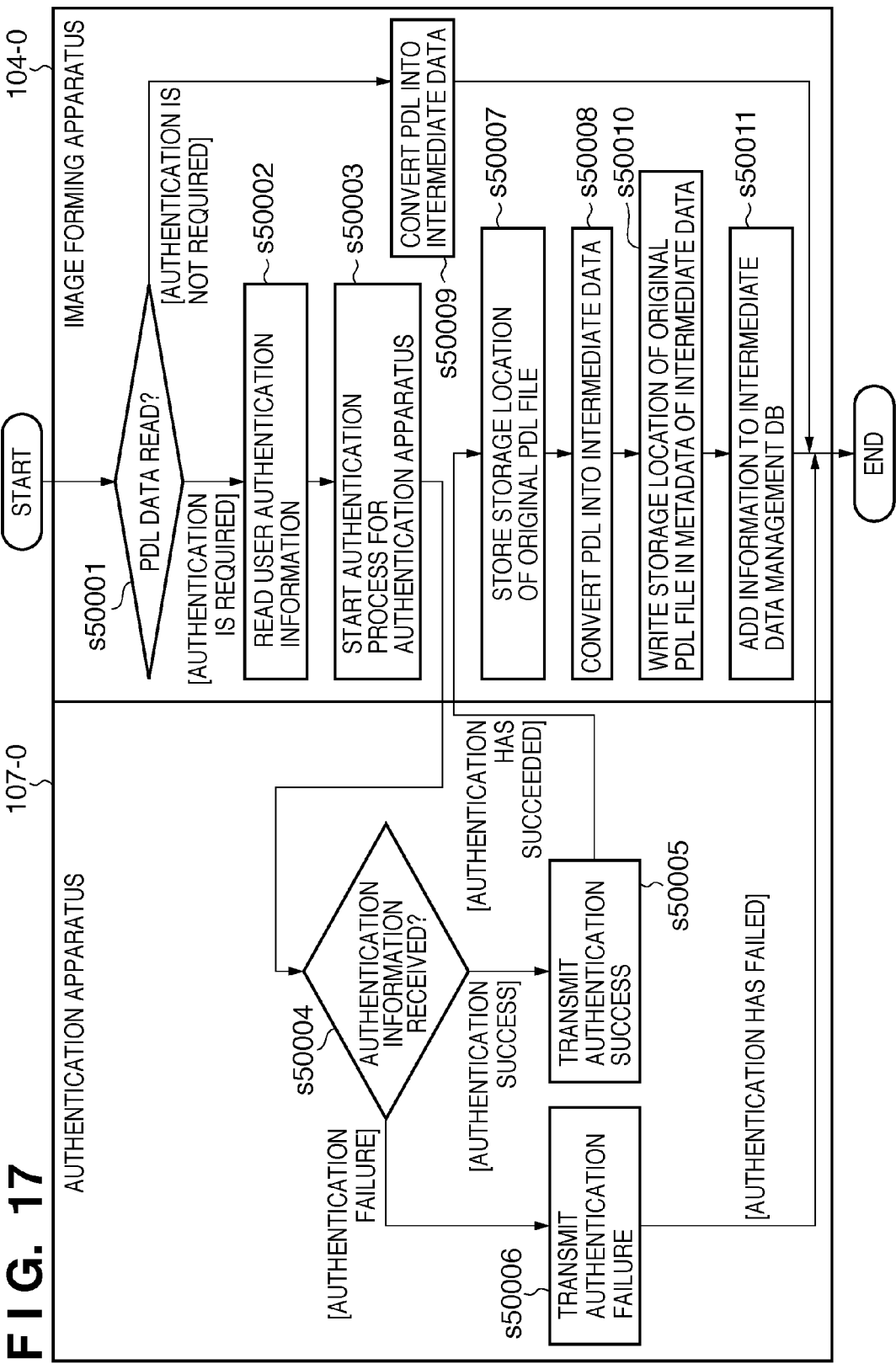
FIG. 17 is a flowchart illustrating the procedure of a process of converting PDL data into intermediate data according to the second embodiment of the present invention.

In this embodiment, a response request from an apparatus in another network to which data cannot be transferred does not reach the authentication apparatus. Referring to FIG. 16, even when the image forming apparatus 104-0 is going to transmit (transfer) the intermediate data to an image forming apparatus 104-2, the transmission (transfer) process is unexecutable if no communication path from the image forming apparatus 104-2 to the authentication apparatus 107-0 can be established by the "ping" command. Processes of the intermediate data can be restricted in this way, and the risk of leaking intermediate data outside the network can be reduced.

It is therefore possible to maintain the security level of the PDL data even in the intermediate data.

As described above, the image forming apparatuses capable of exchanging intermediate data converted from PDL data can place restrictions on processes such as data distribution of the intermediate data or printing using the intermediate data.

<Second Embodiment>

The second embodiment which is different from the first embodiment in "authentication process and conversion process to intermediate data" and "explanation of intermediate data distribution process" will be described next.

[Authentication Process and Conversion Process to Intermediate Data]

As described in the first embodiment, in the process of converting PDL data 500 into intermediate data 400, it is necessary to first perform the authentication process and then transmit the analysis result to an intermediate data generator 10411. This process will be described with reference to FIGS. 2, 8, 13, 14, 15, and 17.

In step S50001, a PDL interpreter 10410 reads out the PDL data 500. The PDL interpreter 10410 determines, based on authentication information 502, whether the target PDL data 500 needs authentication. If it is determined that authentication is necessary, the process advances to step S50002. If it is determined that authentication is unnecessary, the process advances to step S50009.

In step S50002, the PDL interpreter 10410 requests user authentication information necessary for authentication of a user system 10402. The user authentication information indicates an ID and password required for the authentication process. The user system 10402 obtains the user authentication information by the following process.

As described above, an image forming apparatus 104-0 includes a UI controller 10406 and a UI panel 10405. The UI controller 10406 controls the UI panel 10405 to receive an instruction or information associated with authentication from the user and transmit it to the user system 10402. The UI controller 10406 can also control the UI panel 10405 to display and present, to the user, information such as progress of a print process or an error. That is, the user system 10402 obtains authentication information including an ID and password by a user input to the UI panel 10405 and transmits the information to the PDL interpreter 10410.

In step S50003, the PDL interpreter 10410 analyzes the authentication information 502 in the PDL data 500 and starts communicating with the authentication apparatus 107-0 to request the authentication process. In this process, the PDL interpreter 10410 obtains, for example, information to be used for communication with the authentication apparatus 107-0, which is included in the authentication information 502. The process in step S50003 is necessary for establishing communication with the authentication apparatus 107-0 when the image forming apparatus 104-0 and the authentication apparatus 107-0 are connected via the network 102-0 as shown in FIG. 2. More specifically, the PDL interpreter 10410 acquires the IP address of the authentication apparatus 107-0 in this process.

After the communication with the authentication apparatus 107-0 has been established by the above-described process, the PDL interpreter 10410 requests the user system 10402 to perform communication via a network IF 10401. In response to the request, the user system 10402 controls the network IF 10401 to establish communication for the authentication process required by the PDL interpreter 10410. After the establishment of communication, the PDL interpreter 10410 requests the authentication apparatus 107-0 to perform an authentication process based on the authentication information 502.

Upon receiving the authentication process request in step S50004, the authentication apparatus 107-0 executes the authentication process and determines whether the authentication has succeeded. Upon determining that the authentication has succeeded, the authentication apparatus 107-0 advances to step S50005 to notify the image forming apparatus 104-0 of the success of authentication. On the other hand, upon determining that the authentication has failed, the authentication apparatus 107-0 advances to step S50006 to notify the image forming apparatus 104-0 of the failure of authentication.

Upon receiving the notification from the authentication apparatus, the PDL interpreter 10410 of the image forming apparatus 104-0 recognizes the success or failure of authentication. Upon recognizing the success, the process advances to step S50007. Upon recognizing the failure, the process ends without converting the PDL data 500 into the intermediate data 400.

In this embodiment, the image forming apparatus 104-0 requests the authentication apparatus to authenticate the transfer process before converting PDL data into intermediate data. In this embodiment, the arrangement makes it possible to execute, even for intermediate data, authentication to "permit or prohibit a process for each user" which is performed for PDL data.

In step S50007, the PDL interpreter 10410 stores the storage location of the original PDL data as the conversion target. The storage location of the original PDL data indicates the place where the PDL data 500 to be converted into intermediate data is stored. As described above, the image forming apparatus 104-0 receives the PDL data 500 from another apparatus via the network IF 10401. The user system 10402 sends the received PDL data 500 to an IO controller 10403. The IO controller 10403 controls an HDD 10404 to store the PDL data 500 obtained by the user system. In this case, the HDD 10404 corresponds to the storage location.

In this embodiment, the following information is used to specify the storage location of the original PDL data. That is, information which concatenates the IP address of the image forming apparatus on the network and complete path information representing the PDL data storage location (the location of the HDD) in the image forming apparatus 104-0 suffices. An example of data that meets this requirement is a standard called a URI described in Uniform Resource Identifiers, RFC3986. This data format is used in this embodiment. "URI" is short for "Uniform Resource Identifier" which is text information having a format such as file://example.hostname/example.path/example.filename.

After the storage process, the PDL interpreter 10410 interprets the PDL data and notifies the intermediate data generator 10411 of the result, thereby generating the intermediate data 400 in step S50008.

In step S50010, the PDL interpreter 10410 notifies the intermediate data generator 10411 of the storage location of the original PDL data stored in step S50007. The PDL data storage location is added to authentication information 403 that is part of metadata 401 of the intermediate data, and the intermediate data added with the information is stored.

Figure 15:
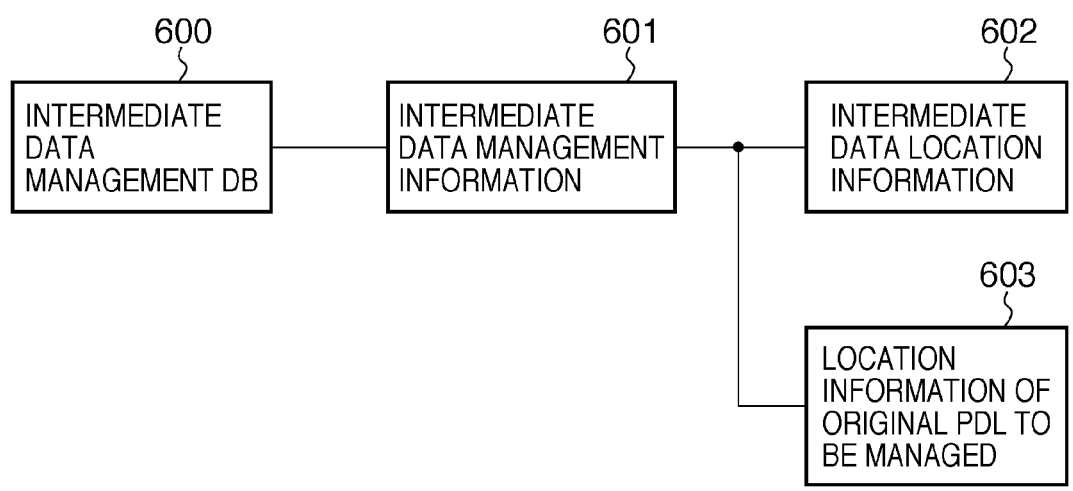
FIG. 15 is a view showing the structure of an intermediate data management DB according to the first embodiment.

In step S50011, the intermediate data generator 10411 adds intermediate data management information 601 corresponding to the intermediate data 400 obtained by the above-described conversion process to an intermediate data management database (DB) 600 having a format shown in FIG. 15.

The data management DB 600 includes the intermediate data management information 601 associated with the converted intermediate data 400. More specifically, the intermediate data management information 601 includes intermediate data location information 602 defined by the above-described URI format, and location information 603 of PDL data as the conversion source of the intermediate data 400 which is also defined by the URI format. The intermediate data management DB 600 manages the PDL data as the conversion source and the converted intermediate data while associating their locations with each other. The process of converting the PDL data 500 into the intermediate data 400 thus finishes.

[Explanation of Intermediate Data Distribution Process]

As in the first embodiment, the intermediate data 400 is obtained by converting the PDL data 500. However, the conversion need not always be performed in the image forming apparatus 104-0. In the arrangement shown in FIG. 9, a plurality of image forming apparatuses and a plurality of information processing apparatuses such as PCs and workstations are connected via the network 102-0 such as a LAN. An image forming apparatus 104-0-1 and information processing apparatuses 101-0-0 and 101-0-1 shown in FIG. 9 can convert the PDL data 500 into the intermediate data 400, like the image forming apparatus 104-0. In this environment, for example, the image forming apparatus 104-0-1 may convert the PDL data 500 into the intermediate data 400 and transmit it to the image forming apparatus 104-0 via the network 102-0 so that the image forming apparatus 104-0 acquires the intermediate data 400. Alternatively, the information processing apparatus 101-0-0 or 101-0-1 may convert the PDL data 500 into the intermediate data 400 and transmit it to the image forming apparatus 104-0 via the network 102-0 so that the image forming apparatus 104-0 acquires the intermediate data 400.

As described above, when the plurality of information processing apparatuses or image forming apparatuses are connected to the network such as a LAN, the apparatuses can exchange intermediate data with each other. This process allows distributing intermediate data generated in a given apparatus to another apparatus. The process of distributing the intermediate data 400 according to the embodiment will be described below with reference to FIGS. 11 and 18.

A router 108 can connect a plurality of networks. A network 102-1 represented by a LAN is connected to the network 102-0 via the router 108 so that the networks can communicate with each other. An image forming apparatus 104-1 can process the intermediate data 400, like the image forming apparatus 104-0.

To explain the process of the embodiment, the procedure of an intermediate data distribution process of transmitting intermediate data from the image forming apparatus 104-0 to the image forming apparatus 104-1 in the above arrangement will be described next with reference to FIG. 18.

In step S60001, an intermediate data interpreter 10412 reads out the intermediate data 400 via the user system 10402. In step S60002, the intermediate data interpreter 10412 reads the metadata from the intermediate data 400. With this process, the intermediate data interpreter 10412 can read the authentication information 403 from the metadata 401. The intermediate data interpreter 10412 determines, based on the read authentication information 403, whether the target intermediate data needs authentication. The determination may be done by referring to, for example, a flag in the authentication information. If it is determined that the target intermediate data 400 needs authentication, the process advances to step S60003. If it is determined that the target intermediate data 400 does not need authentication, the process advances to step S60010. In step S60010, the location of the intermediate data in the intermediate data management DB is newly stored, and the intermediate data is transmitted (transferred) without executing the authentication process of the intermediate data 400.

In step S60003, the intermediate data interpreter 10412 reads the storage location of the conversion source PDL data from the metadata. In step S60004, the intermediate data interpreter 10412 specifies, based on the conversion source PDL data storage location information, the apparatus where the original PDL data is stored. More exactly, information representing the location of the apparatus that stores the PDL data is acquired based on the location information defined by the above-described URI. The information representing the location of the apparatus is, for example, an IP address.

In step S60005, the intermediate data interpreter 10412 obtains user authentication information. The user authentication information indicates, for example, an ID and password necessary for the authentication process. The user system 10402 obtains the user authentication information by the following process.

As shown in FIG. 8, the image forming apparatus 104-0 includes the UI controller 10406 and the UI panel 10405. The UI controller 10406 controls the UI panel 10405 to receive an instruction or information associated with authentication from the user and transmit it to the user system 10402. The UI controller 10406 can also control the UI panel 10405 to display and present, to the user, information such as progress of a print process or an error. That is, the user system 10402 obtains authentication information including an ID and password by a user input to the UI panel 10405 and transmits the information to the intermediate data interpreter 10412.

Next, the intermediate data interpreter 10412 determines, based on the conversion source PDL data storage location information obtained in step S60004, whether the PDL data 500 is stored in the apparatus (i.e., image forming apparatus 104-0). If it is determined that the original PDL data 500 is stored in the apparatus, the process advances to step S60006. If it is determined that the original PDL data 500 is not stored in the apparatus, the process advances to step S60012.

In step S60012, using the storage location information of the original PDL data 500, the intermediate data interpreter 10412 establishes the communication path to another apparatus that stores the PDL data 500. In step S60013, using the communication path established in step S60012, the intermediate data interpreter 10412 requests the apparatus storing the original PDL data 500 to request the authentication apparatus to execute the authentication process of the original PDL data. The apparatus storing the original PDL data 500 is the image forming apparatus 104-1.

Upon receiving the original PDL data authentication process request to the authentication apparatus in step S60013, the PDL interpreter 10410 of the image forming apparatus 104-1 requests the authentication apparatus 107-0 to perform the original PDL data authentication process in step S60014.

On the other hand, if it is determined that the original PDL data is stored in the apparatus, the PDL interpreter 10410 of the image forming apparatus 104-0 similarly requests the authentication apparatus 107-0 to perform the original PDL data authentication process in step S60006.

Figure 18:
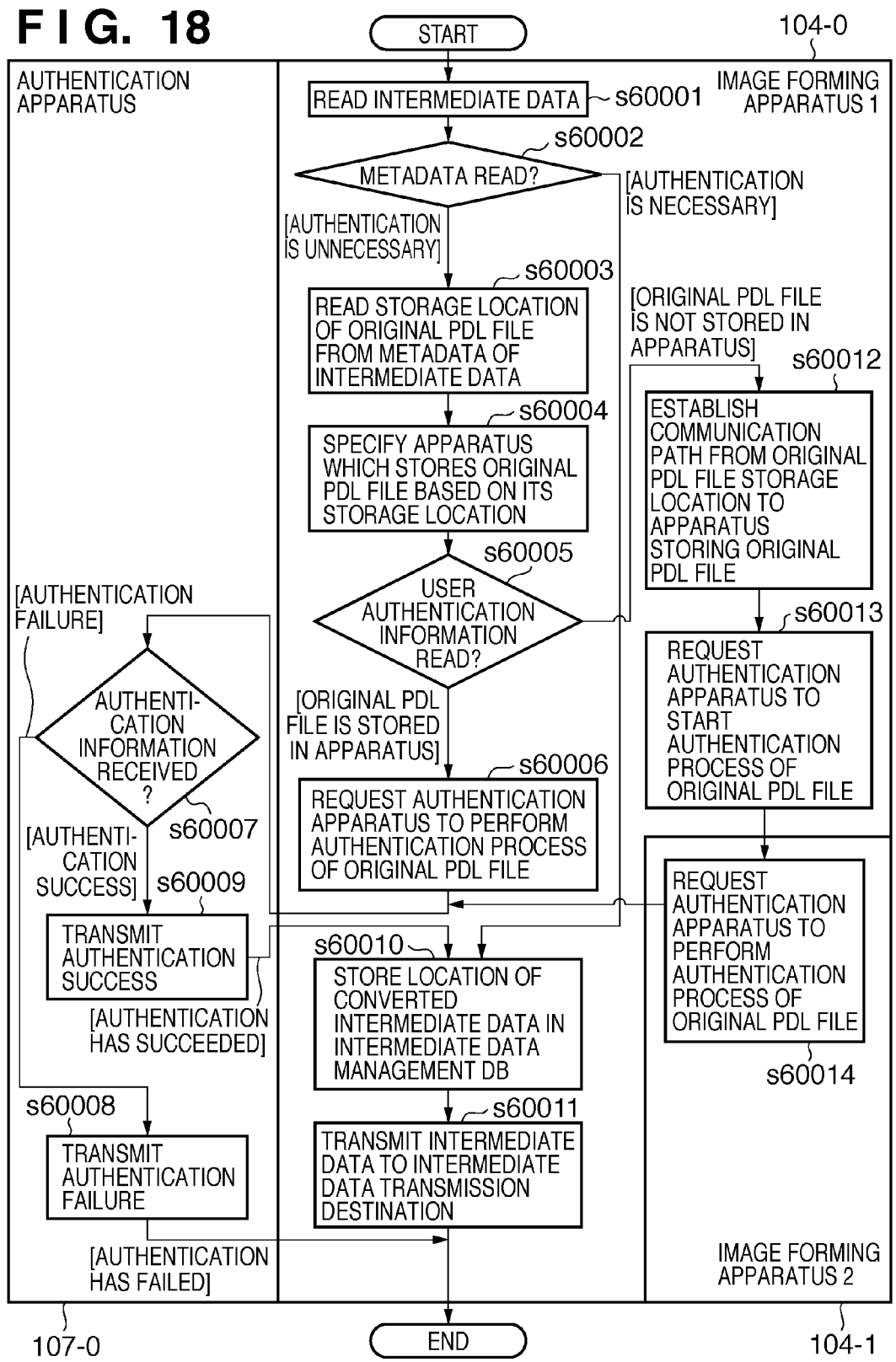
FIG. 18 is a flowchart illustrating the procedure of an intermediate data transmission process according to the second embodiment.

The process in FIG. 18 of the embodiment corresponds to a case in which, for example, the image forming apparatus receives intermediate data externally transferred and further transfers it to another apparatus. In this case, however, the image forming apparatus determines in step S60005 that the original PDL data 500 is not stored in it. Before transferring intermediate data, the image forming apparatus 104-0 requests the apparatus storing the PDL data to request the authentication apparatus to authenticate the transfer process. In this embodiment, the arrangement makes it possible to execute, even for intermediate data, authentication to "permit or prohibit a transfer process for each user" which is performed for PDL data.

Upon receiving the original PDL data authentication process request in step S60006 or S60014, the authentication apparatus 107-0 executes the authentication process using, for example, the authentication information acquired by the image forming apparatus 104-0 in step S60005. Upon determining that the authentication has succeeded, the authentication apparatus 107-0 advances to step S60009 to transmit information representing the success of authentication to the original image forming apparatus 104-0. On the other hand, upon determining that the authentication has failed, the authentication apparatus 107-0 advances to step S60008 to transmit information representing the failure of authentication to the original image forming apparatus 104-0.

Upon receiving the information representing the success of authentication from the authentication apparatus 107-0, the image forming apparatus 104-0 advances to step S60010. On the other hand, upon receiving the information representing the failure of authentication, the process ends without transmitting the intermediate data 400.

In step S60010, the intermediate data interpreter 10412 of the image forming apparatus 104-0 newly stores, in the intermediate data management DB 600, the intermediate data management information 601 associated with the PDL data 500 of the conversion source. That is, the location information 603 of the original PDL data to be managed and the intermediate data location information 602 at the transmission destination of the intermediate data 400 are newly recorded in the apparatus holding the PDL data 500 of the conversion source. In step S60011, the image forming apparatus 104-0 transmits the intermediate data to the intermediate data transmission destination.

According to the above-described embodiment, it is possible to reduce the risk of leaking intermediate data obtained by converting PDL data to any users who are not intended by the PDL data creator (e.g., the user of the apparatus storing the original PDL data).

A process to be executed when original PDL data has been deleted in the second embodiment will be described next.

[Process when Original PDL Data has been Deleted]

Figure 19:
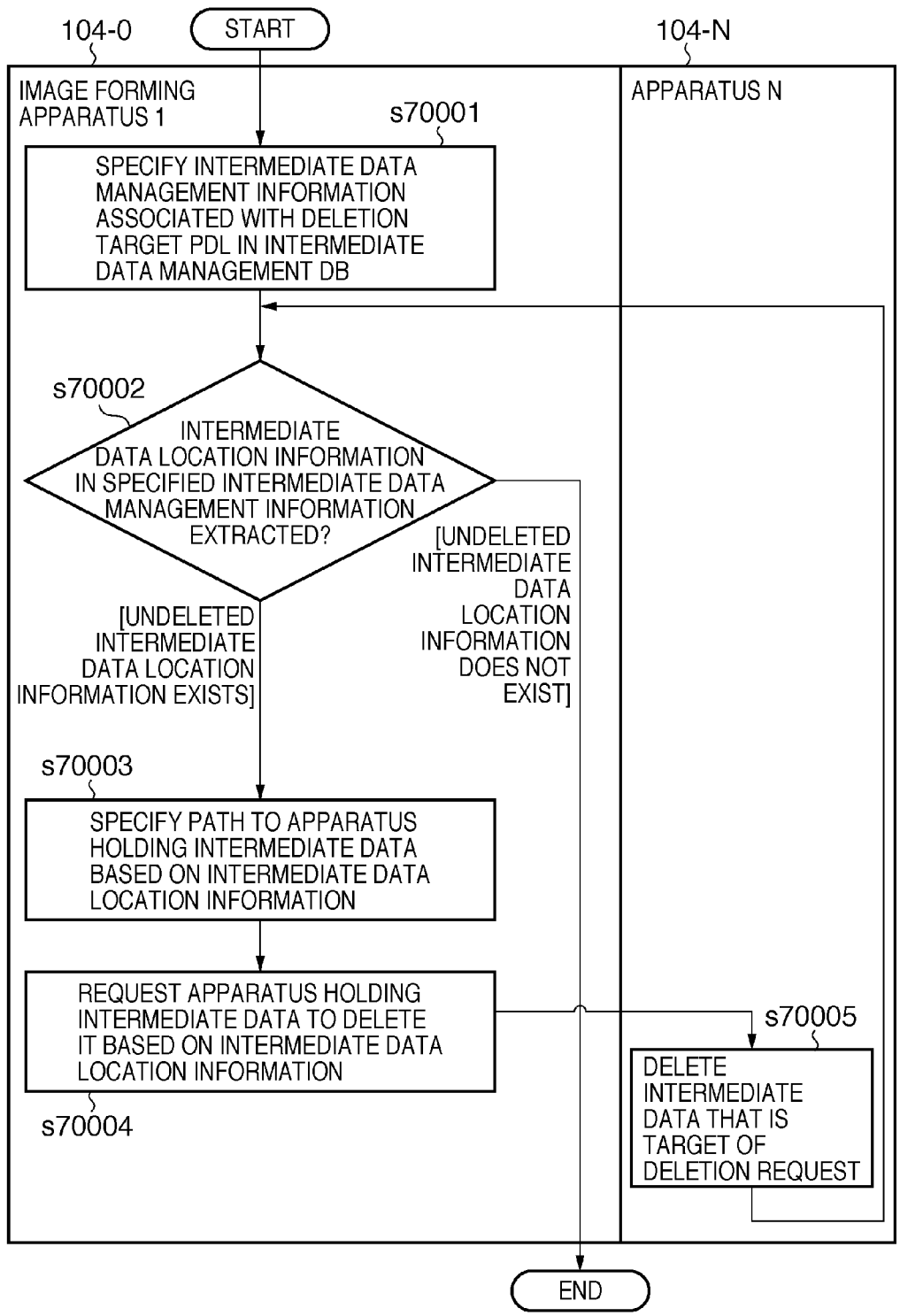
FIG. 19 is a flowchart illustrating the procedure of a process of deleting intermediate data when PDL data has been deleted.

In the second embodiment, when the original PDL data 500 has been deleted, the intermediate data is also deleted. This allows to more strictly manage the intermediate data and maintain the security level of the PDL data even in the intermediate data. This process will be described below with reference to FIGS. 9 and 19.

Upon detecting that the original PDL data has been deleted, in step S70001, the user system 10402 reads out, from the intermediate data management DB 600, the intermediate data management information 601 associated with the PDL data 500 of the conversion source that is the deletion target.

In step S70002, the user system 10402 reads the intermediate data location information 602 from the intermediate data management information 601. With reference to the intermediate data location information 602, the user system 10402 extracts the location information of the transmission destination of each intermediate data 400.

In step S70003, the user system 10402 specifies, based on the extracted location information of the transmission destination of the intermediate data 400, the path information to the apparatus storing the intermediate data 400.

In step S70004, based on the specified path information to the apparatus storing the intermediate data 400, the user system 10402 requests the apparatus to delete the intermediate data 400. In step S70005, an arbitrary image forming apparatus 104-N capable of processing the intermediate data 400 receives the deletion request from the image forming apparatus 104-0 and deletes the intermediate data 400 as the target. The process in steps S70003 to S70005 is repeated until the number of location information of the transmission destinations of the intermediate data 400 that are not deleted becomes zero. When the number of location information of the transmission destinations of the intermediate data 400 becomes zero in the above process, the user system 10402 finishes the process.

As described above, in the second embodiment, when the original PDL data 500 has been deleted, the intermediate data is also deleted. This allows to more strictly manage the intermediate data and maintain the security level of the PDL data even in the intermediate data.

In the above description of the first and second embodiments, the image forming apparatus 104-0 receives the PDL data 500 from another apparatus via the network IF 10401. However, the image forming apparatus may receive the PDL data 500 using a medium other than the network. In the above description, the intermediate data 400 is transmitted from the image forming apparatus 104-0 to another apparatus via the network IF 10401. However, the intermediate data 400 is transmitted outside the image forming apparatus 104-0 using a medium other than the network. In the above description, the conversion from the PDL data 500 into the intermediate data 400 is done in the image forming apparatus 104-0. However, the conversion from the PDL data 500 into the intermediate data 400 may be done in an apparatus other than the image forming apparatus 104-0. For example, the conversion may be performed in an information processing apparatus 101-0-0 or 101-0-1, or an information processing apparatus such as a workstation.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-187910, filed Jul. 18, 2008, which is hereby incorporated by reference herein in its entirety.

What is claimed is:

1. An image forming apparatus which is connected to an authentication apparatus via a network, converts document data that requires authentication by the authentication apparatus, and executes a process using converted data, comprising:

an authentication information acquisition unit configured to acquire authentication information to be used for authentication of the document data an authentication result acquisition unit configured to transmit the authentication information to the authentication apparatus to request authentication and to acquire an authentication result;

a conversion unit configured to convert the document data into the converted data when the authentication result of the document data acquired by said authentication result acquisition unit indicates successful authentication;

an adding unit configured to add specific information to specify the authentication apparatus to the converted data converted by said conversion unit;

a storage unit configured to store the converted data to which said adding unit has added the specific information;

a request unit configured to acquire the specific information from the converted data to which said adding unit has added the specific information, transmit the specific information to a transmission destination of the converted data, and request the transmission destination to confirm establishment of a communication path from the transmission destination to the authentication apparatus specified by the specific information; and a transmission unit configured to transmit the converted data to the transmission destination upon receiving information indicating establishment of the communication path from the transmission destination.

2. The apparatus according to claim 1, wherein the specific information is an IP address of the authentication apparatus.

3. An image forming apparatus which is connected to an authentication apparatus via a network, converts document data that requires authentication by the authentication apparatus, and executes a process using converted data, comprising:

an authentication information acquisition unit configured to acquire authentication information to be used for authentication of the document data an authentication result acquisition unit configured to transmit the authentication information to the authentication apparatus to request authentication and to acquire an authentication result;

a conversion unit configured to convert the document data into the converted data when the authentication result of the document data acquired by said authentication result acquisition unit indicates successful authentication;

an adding unit configured to add specific information to specify an apparatus that stores the document data to the converted data converted by said conversion unit;

a storage unit configured to store the converted data to which said adding unit has added the specific information;

a request unit configured to acquire the specific information from the converted data to which said adding unit has added the specific information, transmit the specific information to the apparatus that stores the document data, and request the apparatus that stores the document data to send an authentication request from the apparatus that stores the document data to the authentication apparatus; and a transmission unit configured to transmit the converted data to a transmission destination upon receiving information indicating successful authentication.

4. The apparatus according to claim 3, wherein the specific information is a URI representing a storage location of the document data.

* * * * *